US012576480B2

(12) United States Patent
Iida et al.

(10) Patent No.: US 12,576,480 B2
(45) Date of Patent: Mar. 17, 2026

(54) DRESSING BOARD AND SHAPE DETERMINING METHOD

(71) Applicant: DISCO CORPORATION, Tokyo (JP)

(72) Inventors: Katsubumi Iida, Tokyo (JP); Junichi Fukuhara, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 428 days.

(21) Appl. No.: 18/476,697

(22) Filed: Sep. 28, 2023

(65) Prior Publication Data

US 2024/0123575 A1 Apr. 18, 2024

(30) Foreign Application Priority Data

Oct. 12, 2022 (JP) ................................. 2022-163980

(51) Int. Cl.
B24D 15/06 (2006.01)
G01B 5/20 (2006.01)

(52) U.S. Cl.
CPC .............. B24D 15/06 (2013.01); G01B 5/20 (2013.01)

(58) Field of Classification Search
CPC .......... B24D 15/06; B24D 15/065; B01B 5/20
USPC ........................ 33/1 BB, 626, 628, 630, 631
See application file for complete search history.

(56) References Cited

U.S. PATENT DOCUMENTS

| | | | | |
|---|---|---|---|---|
| 2,790,339 | A * | 4/1957 | Brink ..................... | B23D 79/00 |
| | | | | 76/82 |
| 5,520,574 | A * | 5/1996 | Wilson ................... | B24B 3/605 |
| | | | | 451/540 |
| 5,558,572 | A * | 9/1996 | Fletcher ................. | B24D 15/06 |
| | | | | 451/523 |
| 9,168,640 | B2 * | 10/2015 | Stanley .................. | B24D 15/08 |
| 9,221,144 | B2 * | 12/2015 | Powell .................... | B24B 3/38 |
| 10,675,736 | B1 * | 6/2020 | Boutorine .............. | B24D 15/06 |
| 10,898,983 | B2 * | 1/2021 | Komatsu ................. | B24B 53/12 |
| 12,304,021 | B2 * | 5/2025 | Iida .......................... | B24B 49/12 |
| 2014/0273779 | A1 * | 9/2014 | Kotapish ............... | B24D 15/06 |
| | | | | 451/552 |
| 2023/0032327 | A1 * | 2/2023 | Iida ......................... | B24B 49/12 |
| 2023/0051072 | A1 * | 2/2023 | Suzuki ................... | B24B 53/12 |
| 2024/0189962 | A1 * | 6/2024 | Nagami ................. | B24B 53/12 |
| 2024/0416486 | A1 * | 12/2024 | Stallegger ........... | B24D 15/081 |

FOREIGN PATENT DOCUMENTS

| | | | | |
|---|---|---|---|---|
| CA | 3093541 | A1 * | 10/2019 | ........ B23K 11/3063 |
| JP | 2000087282 | A | 3/2000 | |

* cited by examiner

*Primary Examiner* — George B Bennett

(74) *Attorney, Agent, or Firm* — Greer Burns & Crain Ltd.

(57) ABSTRACT

A dressing board for dressing a tip end of a cutting blade includes a lower surface to be held on a table and a slanted surface inclined to the lower surface and oriented across a direction in which the cutting blade is movable relatively to the table such that the tip end of the cutting blade moves across and over the slanted surface when the cutting blade is moved relatively to the table.

6 Claims, 7 Drawing Sheets

DRESSING BOARD AND SHAPE DETERMINING METHOD

BACKGROUND OF THE INVENTION

Field of the Invention

The present invention relates to a dressing board for dressing a cutting blade and a shape determining method of determining a shape of a tip end of a cutting blade using such a dressing board.

Description of the Related Art

Electronic appliances represented by cellular phones and personal computers include device chips, as indispensable components, having devices such as electronic circuits. Device chips are fabricated by, for example, demarcating a plurality of areas in a face side of a wafer made of a semiconductor material such as silicon with a grid of projected dicing lines or streets, constructing devices in the respective areas, and thereafter dividing the wafer along the projected dicing lines.

For cutting a plate-shaped workpiece typified by a wafer into small pieces such as device chips, it is customary to use a cutting apparatus having a processing tool referred to as a cutting blade that is made of abrasive grains dispersed in a binder. When the cutting apparatus is in use, the cutting blade is rotated about its central axis at a high speed and caused to cut into the workpiece along projected dicing lines established thereon while a processing liquid such as pure water is being supplied to the cutting blade and the workpiece, thereby cutting the workpiece into a plurality of small pieces (see, for example, JP 2000-87282A).

SUMMARY OF THE INVENTION

When the cutting blade processes, i.e., cuts, the workpiece, the cutting blade has its tip end worn to a round shape as the cutting progresses. If the cutting blade cuts the workpiece with the round tip end, then the round shape of the tip end of the cutting blade is transferred to the workpiece, making it difficult to process the workpiece into a desired shape. In addition, the round shape of the tip end may cause the cutting blade to have its mechanical strength reduced and make itself asymmetrical in shape, tending to result in vibrations of the cutting blade when it cuts into the workpiece, which may suffer a reduction in its quality as processed.

One solution has been to cause the cutting blade to cut into a flat plate-shaped member and observe the shape of a mark (hereinafter referred to as "processing mark") left on the flat plate-shaped member by the cutting blade sideways of the flat plate-shaped member for thereby determining whether the tip end of the cutting blade is round or not. However, since the solution requires the flat plate-shaped member to be re-positioned with respect to a camera or the like in order to allow the shape of the processing mark to be observed sideways of the flat plate-shaped member using the camera or the like, the whole process is tedious and time-consuming, requiring a long period of time to be consumed until the determination of the shape of the tip end of the cutting blade is completed.

It is therefore an object of the present invention to provide a dressing board that makes it easy to determine the shape of the tip end of a cutting blade that is dressed by the dressing board and a shape determining method of determining the shape of the tip end of a cutting blade using such a dressing board.

In accordance with an aspect of the present invention, there is provided a dressing board for dressing a tip end of a cutting blade. The dressing board includes a lower surface to be held on a table and a slanted surface inclined to the lower surface and oriented across a direction in which the cutting blade is movable relatively to the table such that the tip end of the cutting blade moves across and over the slanted surface when the cutting blade is moved relatively to the table.

Preferably, the angle formed between the lower surface and the slanted surface is in a range from 30° to 60°.

In accordance with another aspect of the present invention, there is provided a shape determining method of determining the shape of the tip end of a cutting blade. The method includes holding a lower surface of a dressing board on a table, the dressing board having a slanted surface inclined to the lower surface thereof, causing the tip end of the cutting blade to cut into the dressing board while the cutting blade is being moved relatively to the table such that the tip end of the cutting blade moves across and over the slanted surface that is oriented across a direction in which the cutting blade is movable relatively to the table, and confirming the shape of a processing mark left on the slanted surface by the tip end of the cutting blade that has moved across and over the slanted surface, from a side of the dressing board opposite the lower surface thereof, thereby determining the shape of the tip end of the dressing board.

In the shape determining method, preferably, the tip end of the cutting blade cuts into the dressing board and moves across and over the slanted surface without moving across an end of the slanted surface at the lower surface of the dressing board. Preferably, the shape determining method includes determining the shape of the tip end of the cutting blade as curved if an end of the processing mark confirmed from the side of the dressing board opposite the lower surface thereof is of a curved shape.

The dressing board according to the aspect of the present invention has the lower surface to be held on the table and the slanted surface, in which the tip end of the cutting blade moves across and over the slanted surface when the cutting blade is moved relatively to the table. Simply when the processing mark is left on the slanted surface by the tip end of the cutting blade that has cut into the dressing board and moved relatively to the table such that the tip end of the cutting table has moved across and over the slanted surface, the shape of the processing mark can easily be confirmed from the side of the dressing board opposite the lower surface thereof.

With the dressing board according to the aspect of the present invention and the shape determining method according to the other aspect of the present invention, therefore, the dressing board does not need to be repositioned with respect to a camera in preparation for confirming the shape of the processing mark that is commensurate with the shape of the tip end of the cutting blade. Consequently, the shape of the tip end of the cutting blade can be determined more easily than with the conventional process.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
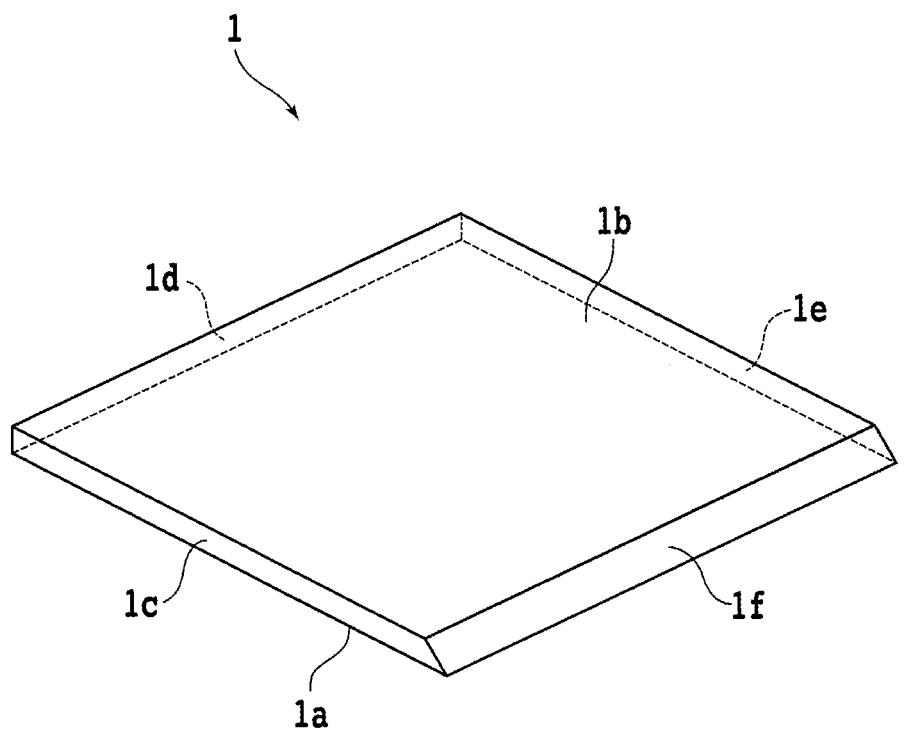
FIG. 1 is a perspective view schematically illustrating a structure of a dressing board according to an embodiment of the present invention.

A preferred embodiment of the present invention will be described hereinbelow with reference to the accompanying drawings. FIG. 1 schematically illustrates in perspective a structure of a dressing board 1 according to the present embodiment. The dressing board 1 includes, for example, a flat plate made of abrasive grains of white alundum (WA), green carborundum (GC), or the like dispersed in a binder of resin, ceramic, or the like.

The dressing board 1 is used in dressing an annular cutting blade, i.e., processing tool, to improve its shape and performance and/or in determining the shape of a tip end of the cutting blade. The cutting blade to be processed by the dressing board 1 is made of abrasive grains dispersed in a binder, for example.

As illustrated in FIG. 1, the dressing board 1 has a substantially flat rectangular lower surface 1a and a substantially flat rectangular upper surface 1b opposite the lower surface 1a. The rectangular lower surface 1a has four sides or ends, three of which are joined to the upper surface 1b respectively by a side surface 1c, a side surface 1d, and a side surface 1e of the dressing board 1. The lower surface 1a and the upper surface 1b lie generally parallel to each other, and the side surfaces 1c, 1d, and 1e extend generally perpendicularly to the lower surface 1a and the upper surface 1b.

The remaining one of the four sides or ends of the rectangular lower surface 1a is joined to the upper surface 1b by a slanted surface 1f that is inclined to the lower surface 1a and the upper surface 1b. The slanted surface 1f is generally flat and extends obliquely to the lower surface 1a or the upper surface 1b at a predetermined angle. Flatness of the slanted surface 1f may be to such a degree that it allows the shape of the tip end of the cutting blade as reflected on the slanted surface 1f to be confirmed from above, i.e., from the upper surface 1b side.

An angle θ1 (see FIG. 4) formed between the lower surface 1a or the upper surface 1b and the slanted surface 1f is not essentially restricted to any value. However, if the angle θ1 between the lower surface 1a and the slanted surface 1f is in a range from 30° to 60°, then the shape of the tip end of the cutting blade as reflected on the slanted surface 1f can sufficiently be confirmed from the upper surface 1b side. Furthermore, if the angle θ1 between the lower surface 1a and the slanted surface 1f is in a range from 43° to 48°, or is typically 45°, then the shape of the tip end of the cutting blade as reflected on the slanted surface 1f can more be confirmed, in a rigorous manner, from the upper surface 1b side.

The dressing board 1 may be fabricated by various processes. For example, the dressing board 1 according to the present embodiment may be fabricated by processing a general dressing board that is free of the slanted surface 1f to form the slanted surface 1f thereon according to any of various processes including a cutting process, a laser beam applying process, an etching process, etc.

Figure 2:
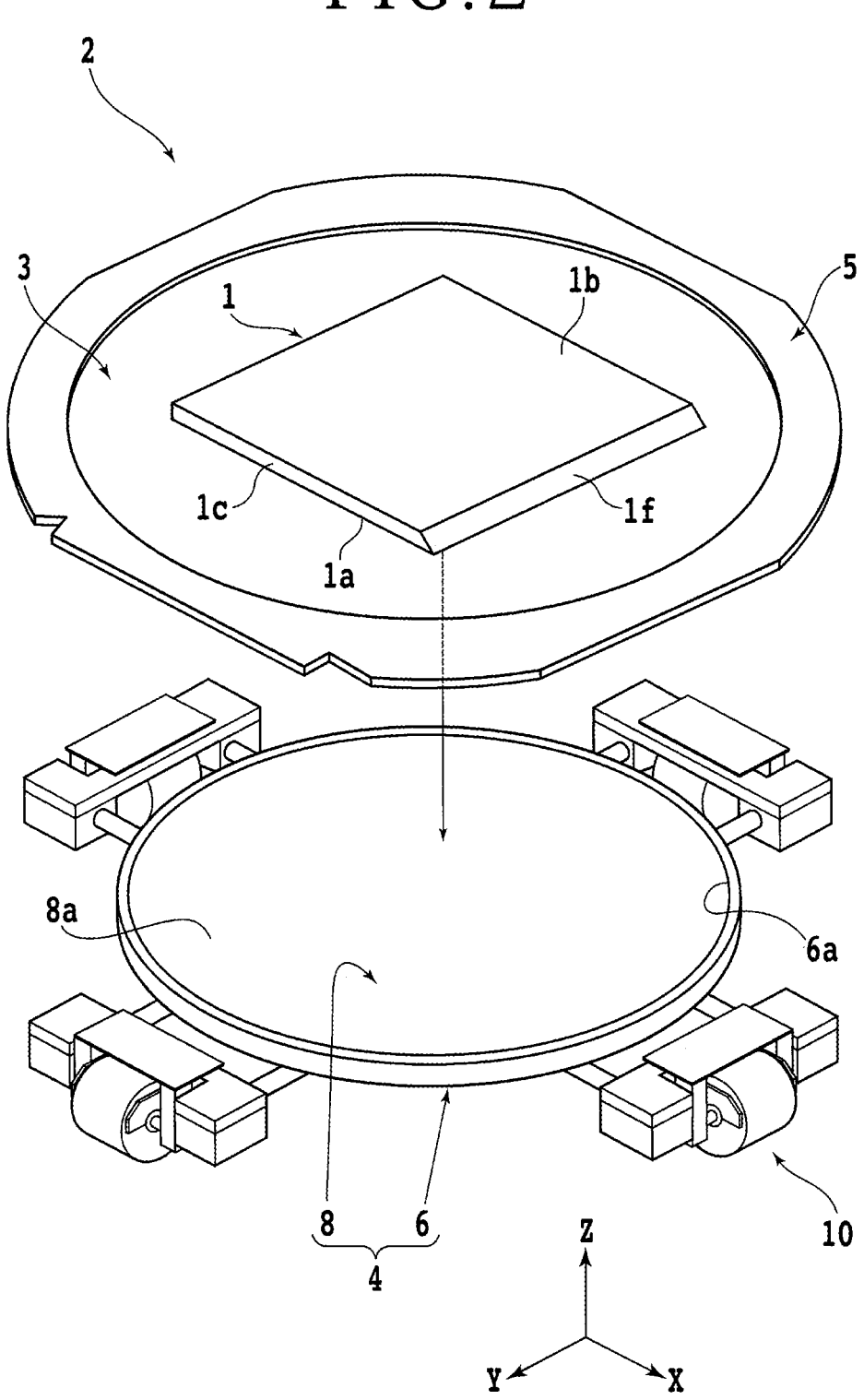
FIG. 2 is a perspective view schematically illustrating the manner in which the dressing board is held on a table.

A shape determining method according to the present embodiment of determining the shape of the tip end of a cutting blade using the dressing board 1 described above will be described below. In the shape determining method, the lower surface 1a of the dressing board 1 is held on a table of a processing apparatus (holding step). FIG. 2 schematically illustrates in perspective the manner in which the dressing board 1 is held on a table, i.e., a chuck table, 4 of a cutting apparatus, i.e., a processing apparatus, 2.

As illustrated in FIG. 2, the cutting apparatus 2 used in the present embodiment includes a table 4 for holding a plate-shaped workpiece, not illustrated, represented by a semiconductor wafer. The table 4 includes a disk-shaped frame 6 made of a metal material, typically, stainless steel, for example. The frame 6 has a cavity 6a defined in an upper surface side thereof and having a circular opening in in its upper end.

A disk-shaped porous holding plate 8 made of ceramic or the like is securely fitted in the cavity 6a in the frame 6. The holding plate 8 has an upper surface 8a lying substantially flatwise that functions as a holding surface for holding the workpiece thereon. The holding plate 8 has a lower surface fluidly connected to a suction source, not illustrated, such as an ejector through a fluid channel defined in the frame 6 and a valve, not illustrated, etc.

In preparation for processing, i.e., cutting, the workpiece on the cutting apparatus 2, a circular tape referred to as a dicing tape that is larger in diameter than the workpiece is affixed to the lower surface of the workpiece. The tape has an outer circumferential edge portion to which an annular frame is fixed in surrounding relation to the workpiece on the tape. The workpiece is placed on the holding plate 8 with the tape interposed therebetween. Four clamps 10 for gripping the annular frame fixed to the tape are mounted on a circumferential portion of the frame 6 at circumferentially spaced intervals.

The frame 6 has a lower portion coupled to a rotary actuator, not illustrated, such as an electric motor. When the rotary actuator is energized, it rotates the table 4 and the clamps 10 about a rotational axis aligned with a center of the upper surface 8a and extending vertically along a Z-axis perpendicular to the upper surface 8a, for example. The frame 6 is supported on a table moving mechanism, not illustrated, for moving the table 4 in a processing feed direction along an X-axis generally parallel to the upper surface 8a.

As illustrated in FIG. 2, as is the case with the workpiece, the dressing board 1 is supported on an annular frame 5 by a circular tape, referred to as a dicing tape, 3 larger in diameter than the dressing board 1. Before the dressing board 1 is held on the table 4, the tape 3 is affixed to the lower surface 1*a* of the dressing board 1. The tape 3 has an outer circumferential edge portion to which the annular frame 5 is fixed in surrounding relation to the dressing board 1 on the tape 3.

When the dressing board 1 is to be held on the table 4, the tape 3 affixed to the lower surface 1*a* of the dressing board 1 has its lower surface remoted from the dressing board 1 brought into contact with the upper surface 8*a* of the table 4. Then, the annular frame 5 fixed to the outer circumferential edge portion of the tape 3 is gripped by the four clamps 10. Thereafter, the suction source is actuated and the valve is opened to transmit a suction force generated by the suction source through the fluid channel to the table 4. The lower surface 1*a* of the dressing board 1 is now held under suction on the table 4 with the tape 3 interposed therebetween, and the upper surface 1*b* of the dressing board 1 is exposed upwardly.

According to the present embodiment, the table 4 that is used to hold the workpiece thereon when the workpiece is processed, i.e., cut, is also used to hold the dressing board 1 thereon. However, a dedicated sub-table for holding the dressing board 1 thereon, i.e., a sub-chuck table, or the like, not illustrated, disposed next to the table 4 may be used to hold the dressing board 1 thereon. If such a dedicated sub-table is used to hold the dressing board 1 thereon, then the dressing board 1 may not be supported on the frame 5 by the tape 3, and may be directly held on the sub-table.

Figure 3:
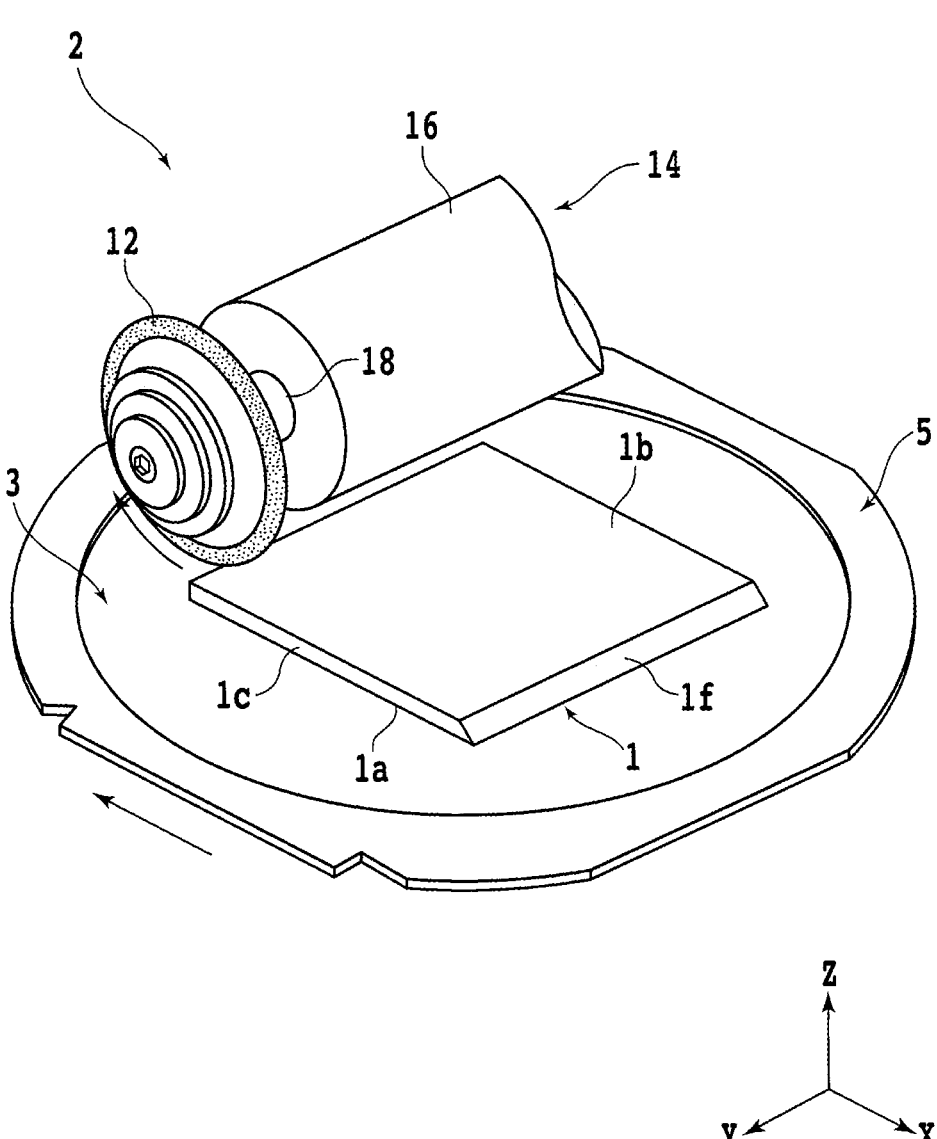
FIG. 3 is a perspective view schematically illustrating the manner in which a tip end of a cutting blade cuts into the dressing board.

After the lower surface 1*a* of the dressing board 1 has been held on the table 4 or the like, a cutting blade of the cutting apparatus 2 is operated to cause its tip end to cut into the dressing board 1 and move across the slanted surface 1*f* of the dressing board 1 (cutting step). FIG. 3 schematically illustrates in perspective the manner in which the tip end of a cutting blade, i.e., a processing tool, 12 of the cutting apparatus 2 cuts into the dressing board 1. In FIG. 3, the table 4 holding the dressing board 1, etc. is omitted from illustration for the sake of brevity.

As illustrated in FIG. 3, the cutting apparatus 2 includes a cutting unit, i.e., a processing unit, 14 disposed above the dressing board 1 held on the table 4. The cutting unit 14 includes a tubular spindle housing 16. A spindle 18 has a portion rotatably housed in the spindle housing 16 such that the spindle 18 is rotatable about a rotational axis extending in an indexing feed direction along a Y-axis that is perpendicular to the X-axis and the Z-axis.

The spindle 18 has an end portion exposed out of the spindle housing 16. The cutting blade, denoted by 12 in FIG. 3, of the cutting apparatus 2 is mounted on the exposed end portion of the spindle 18. The cutting blade 12 is made of abrasive grains of diamond or the like dispersed in a binder of resin, metal, or the like. The spindle 18 has an opposite end portion coupled to a rotary actuator, not illustrated, such as an electric motor. When the rotary actuator is energized, it rotates the spindle 18 about its rotational axis and hence the cutting blade 12 about its central axis that is aligned with the rotational axis of the spindle 18.

The spindle housing 16, i.e., the cutting unit 14, is supported on a cutting unit moving mechanism, not illustrated, for example. The cutting unit 14 is movable in the indexing feed direction along the Y-axis and in vertical directions along the Z-axis by the cutting unit moving mechanism.

The cutting apparatus 2 cuts the workpiece as follows. After the vertical position of the cutting unit 14 has been adjusted, the table 4 with the workpiece held thereon is moved in the processing feed direction while the cutting blade 12 is being rotated. The rotating cutting blade 12 cuts into the workpiece on the table 4, thereby cutting the workpiece. In other words, the cutting blade 12 processes, i.e., cuts, the workpiece on the table 4 while relatively moving with respect to the table 4 on which the workpiece is held.

For causing the tip end of the cutting blade 12 to cut into the dressing board 1, an orientation of the table 4 about its rotational axis is adjusted to direct the slanted surface 1*f* of the dressing board 1 across the processing feed direction, i.e., the direction in which the cutting blade 12 and the dressing board 1 move relatively to each other. Specifically, the orientation of the table 4 about its rotational axis is adjusted to have longitudinal directions of the slanted surface 1*f* extending across the processing feed direction, i.e., the direction in which the cutting blade 12 and the dressing board 1 move relatively to each other.

The angle formed between the processing feed direction and the longitudinal directions of the slanted surface 1*f* is not restricted to any value. However, the shape of the tip end of the cutting blade 12 can be confirmed from the upper surface 1*b* side in a more rigorous manner, the closer the angle becomes to a right angle. Typically, the shape of the tip end of the cutting blade 12 can sufficiently be confirmed if the orientation of the table 4 about its rotational axis is adjusted to keep the angle formed between the processing feed direction and the longitudinal directions of the slanted surface 1*f* in a range from 85° to 95•, i.e., in a range of 90°±5°.

After the orientation of the table 4 has been adjusted or before the orientation of the table 4 is adjusted, the vertical position of the cutting unit 14 is adjusted. Specifically, the vertical position of the cutting unit 14 is adjusted to make a height of a lower edge of the cutting blade 12 smaller than the height of the upper end of the slanted surface 1*f* of the dressing board 1, i.e., the end of the slanted surface 1*f* at the upper surface 1*b*. In addition, the vertical position of the cutting unit 14 is adjusted to make the height of the lower edge of the cutting blade 12 larger than the height of the lower end of the slanted surface 1*f* of the dressing board 1, i.e., the end of the slanted surface 1*f* at the lower surface 1*a*.

Figure 4:
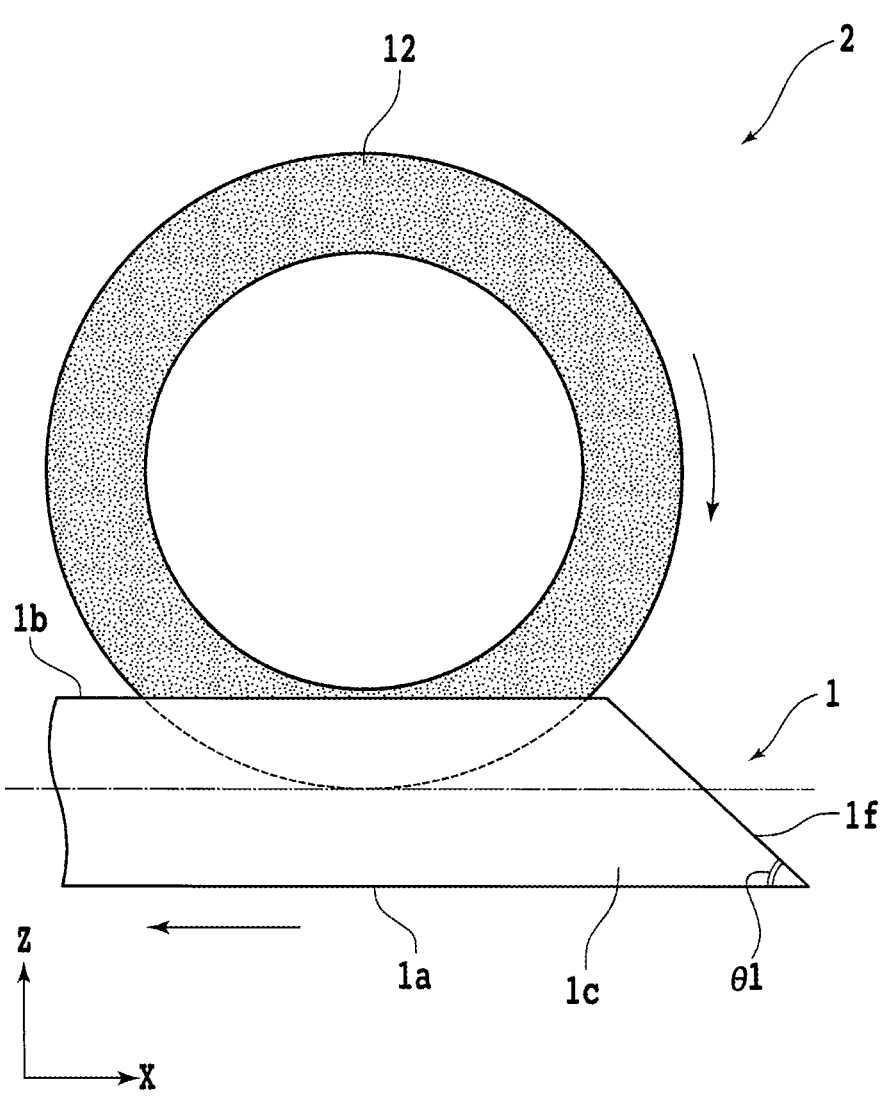
FIG. 4 is a side elevational view schematically illustrating the manner in which the tip end of the cutting blade cuts into the dressing board.

As illustrated in FIG. 3, the table 4 with the workpiece held thereon is moved in the processing feed direction while the cutting blade 12 is being rotated, causing the cutting blade 12 to cut into the dressing board 1. FIG. 4 schematically illustrates in side elevation the manner in which the tip end of the cutting blade 12 cuts into the dressing board 1. In FIG. 4, the dressing board 1 and the cutting blade 12 alone are illustrated for the sake of brevity.

Figure 5:
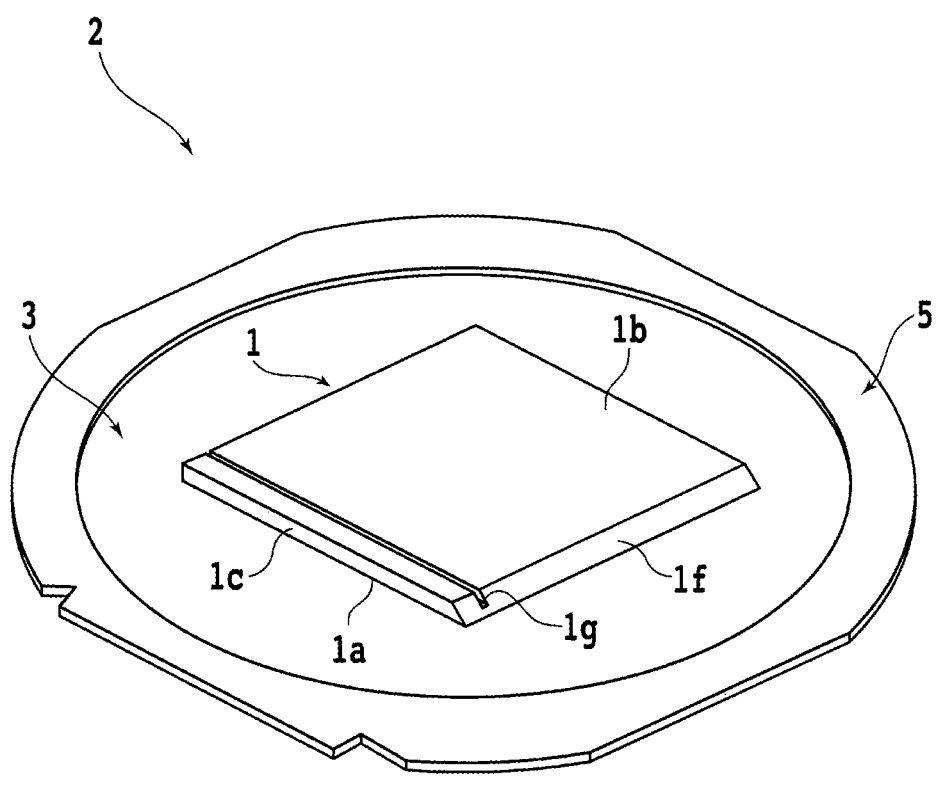
FIG. 5 is a perspective view schematically illustrating the dressing board with a processing mark left thereon by the cutting blade.
Figure 5:
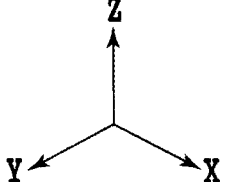

The orientation of the slanted surface 1*f* and the height of the cutting blade 12 with respect to the slanted surface 1*f* have been adjusted as described above. Consequently, when the cutting blade 12 cuts into the dressing board 1 and the table 4 moves in the processing feed direction along the X-axis, the tip end of the cutting blade 12 moves across and over the slanted surface 1*f* without reaching, i.e., moving across, the lower end of the slanted surface 1*f* at the lower surface 1*a*. As a result, the cutting blade 12 leaves a processing mark as a slit on the slanted surface 1*f* of the dressing board 1 that is complementary in shape to the tip end of the cutting blade 12. FIG. 5 schematically illustrates in perspective the dressing board 1 with the processing mark, denoted by 1*g*, left thereon by the cutting blade 12.

Figure 6:
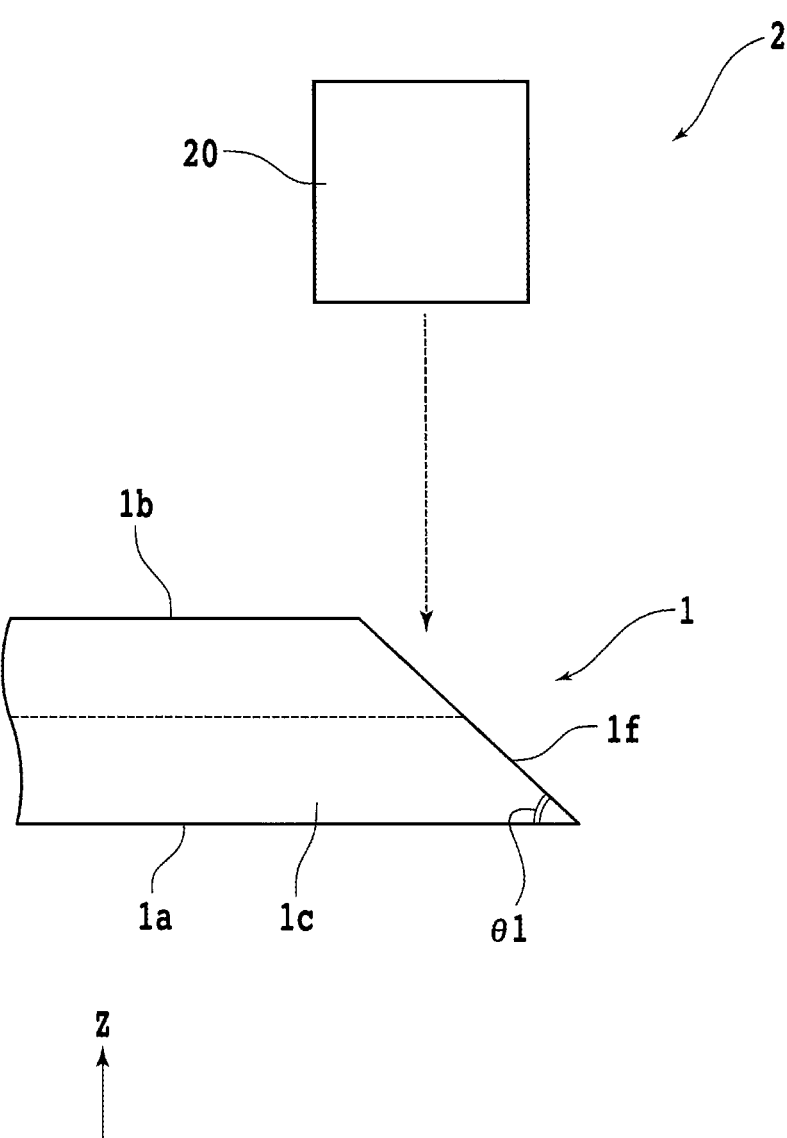
FIG. 6 is a side elevational view schematically illustrating the manner in which the shape of the processing mark left on a slanted surface of the dressing board is confirmed.

After the processing mark 1*g* has been left on the slanted surface 1*f*, the shape of the tip end of the cutting blade 12 can be determined by confirming the shape of the processing mark 1*g* from the upper surface 1*b* side of the dressing board 1 opposite the lower surface 1*a* side (shape determining step). FIG. 6 schematically illustrates in side elevation the manner in which the shape of the processing mark 1*g* left on the slanted surface 1*f* of the dressing board 1 is confirmed. In FIG. 6, only a major component for confirming the shape of the processing mark 1*g* in addition to the dressing board 1 is illustrated for the sake of brevity.

As illustrated in FIG. 6, a camera 20 for capturing an image of the dressing board 1 is disposed above the dressing board 1 held on the table 4. The camera 20 includes a two-dimensional optical image sensor such as a complementary metal oxide semiconductor (CMOS) sensor or a charge-coupled device (CCD) image sensor sensitive to visible light, for example, and is fixedly mounted on the cutting unit 14. The camera 20 is thus movable in unison with the cutting unit 14 in the indexing-feed direction and the vertical directions by the cutting unit moving mechanism.

Figure 7:
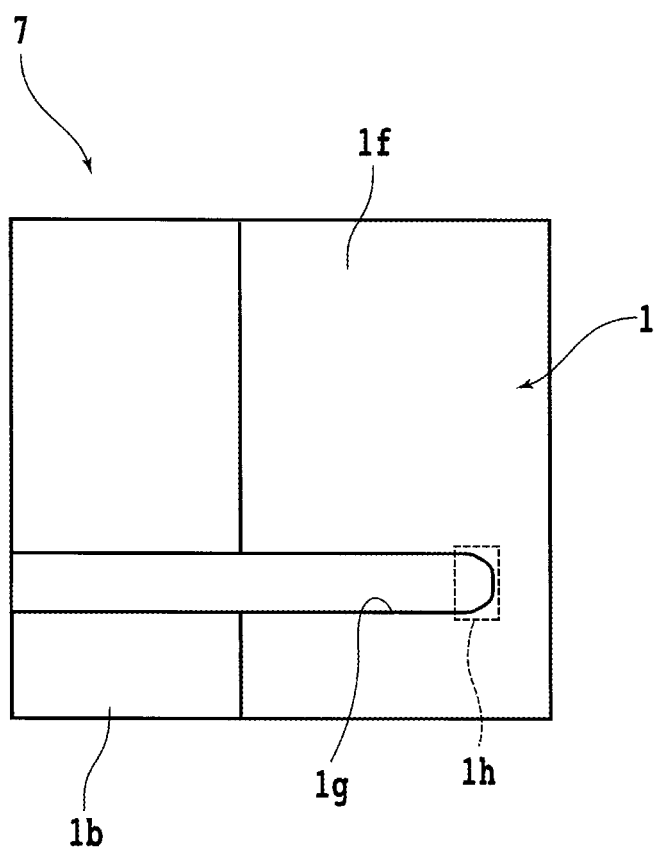
FIG. 7 is a view illustrating by way of example an image captured by a camera of the processing mark left on the slanted surface of the dressing board.

For confirming the shape of the processing mark 1*g* on the slanted surface 1*f* from the upper surface 1*b* side, the table 4 and the camera 20 are positionally adjusted to have the camera 20 positioned directly above the processing mark 1*g*. Then, the camera 20 captures an image of an area including the processing mark 1*g* on the slanted surface 1*f* from above the dressing board 1, i.e., from the upper surface 1*b* side opposite the lower surface 1*a* side. FIG. 7 illustrates by way of example an image 7 captured by the camera 20 of the processing mark 1*g* left on the slanted surface 1*f* of the dressing board 1.

As described above, the slanted surface 1*f* of the dressing board 1 is inclined to the lower surface 1*a* thereof that is held on the table 4. Consequently, the camera 20 disposed above the table 4 captures the slanted surface 1*f* of the dressing board 1 and can acquire the image 7 that includes the processing mark 1*g* reflecting the shape of the tip end of the cutting blade 12. It is thus possible to determine the shape of the tip end of the cutting blade 12 from the shape of the processing mark 1*g* included in the image 7.

For example, if an end 1*h* of the processing mark 1*g* that is positioned closer to the lower end of the slanted surface 1*f* is curved and has round corners as illustrated in FIG. 7, then the tip end of the cutting blade 12 is determined as being curved and having round corners. That is, it is determined that the corner existing at the tip end of the cutting blade 12 is worn out. On the other hand, if the end 1*h* of the processing mark 1*g* is straight and has angular corners, then the tip end of the cutting blade 12 is determined as being straight and having angular corners.

The cutting apparatus 2 includes a controller, i.e., a computer, not illustrated, for controlling the components of the cutting apparatus 2. The controller is supplied with image data of the image 7 captured by the camera 20 and processes the image data to determine the shape of the tip end of the cutting blade 12 and produces a determined result. The controller indicates the determined result via an indicating device, not illustrated, such as a warning lamp (light), a speaker (sound), or a display (image) to the operator of the cutting apparatus 2. Alternatively, the operator may subjectively determine the shape of the tip end of the cutting blade 12 by visually confirming the shape of the processing mark 1*g* without using the camera 20 to acquire the image 7.

As described above, the dressing board 1 according to the present embodiment has the lower surface 1*a* held on the table 4 and the flat slanted surface 1*f* inclined to the lower surface 1*a*. When the cutting blade 12 cuts into the dressing board 1 and is moved with respect to the dressing board 1 in the processing feed direction, the tip end of the cutting blade 12 moves across and over the slanted surface 1*f* without reaching the lower end of the slanted surface 1*f*, leaving the processing mark 1*g* on the slanted surface 1*f*. The shape of the processing mark 1*g* can easily be confirmed from the upper surface 1*b* side that is opposite the lower surface 1*a* of the dressing board 1.

With the dressing board 1 and the shape determining method according to the present embodiment, therefore, the dressing board 1 does not need to be repositioned with respect to the camera 20 or the like in preparation for confirming the shape of the processing mark 1*g* that is commensurate with the shape of the tip end of the cutting blade 12. Consequently, the shape of the tip end of the cutting blade 12 can be determined more easily than with the conventional process.

With the dressing board 1 and the shape determining method according to the present embodiment, therefore, furthermore, the confirmation of the shape of the tip end of the cutting blade 12 and the dressing of the cutting blade 12 on the dressing board 1 are simultaneously carried out. Therefore, the workpiece can efficiently be processed by the cutting blade 12. Since the cutting blade 12 can be dressed while the shape of the tip end of the cutting blade 12 is being determined, conditions for dressing the cutting blade 12 can be optimized for changes in the shape of the tip end of the cutting blade 12, for example.

The present invention is not limited to the embodiment described above. Rather, various changes and modifications may be made in the embodiment. For example, according to the embodiment, the shape of the tip end of the cutting blade 12 is determined on the basis of the processing mark 1*g* left on the slanted surface 1*f* of the dressing board 1. However, a deformation such as a bend of the cutting blade 12 may be determined on the basis of the processing mark 1*g*. In this case, the side surface 1*d*, etc. of the dressing board 1 may have a stepped structure, for example, that allows a deformation such as a bend of the cutting blade 12 to be determined with ease.

According to the embodiment, the cutting blade 12 cuts into the dressing board 1 while the cutting blade 12 is being moved relatively to the table 4 in the processing feed direction, i.e., the direction along the lower surface 1*a*. However, the cutting blade 12 may cut into the dressing board 1 to cause the tip end thereof to move across the slanted surface 1*f* while the cutting blade 12 is being moved relatively to the table 4 in a vertical direction, i.e., a direction perpendicular to the lower surface 1*a*.

Moreover, according to the embodiment, the tape 3 is affixed to the lower surface 1*a* of the dressing board 1, and the lower surface 1*a* is held on the table 4 with the tape 3 interposed therebetween. However, a plate of resin or the like may be affixed to the lower surface 1*a* of the dressing board 1, and the lower surface 1*a* is held on the table 4 with the plate interposed therebetween. If the dressing board 1 is held on the dedicated sub-table referred to above, then the tape 3 and the plate of resin or the like may not be used.

The structural details, method details, etc. of the embodiment and modifications described above may be changed or modified without departing from the scope of the invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A dressing board for dressing a tip end of a cutting blade, comprising:

a lower surface to be held on a table; and a slanted surface inclined to the lower surface and oriented across a direction in which the cutting blade is movable relatively to the table such that the tip end of the cutting blade moves across and over the slanted surface when the cutting blade is moved relatively to the table.

2. The dressing board according to claim 1, wherein an angle formed between the lower surface and the slanted surface is in a range from 30° to 60°.

3. A shape determining method of determining a shape of a tip end of a cutting blade, the method comprising:

holding a lower surface of a dressing board on a table, the dressing board having a slanted surface inclined to the lower surface thereof;

causing the tip end of the cutting blade to cut into the dressing board while the cutting blade is being moved relatively to the table such that the tip end of the cutting blade moves across and over the slanted surface that is oriented across a direction in which the cutting blade is movable relatively to the table; and confirming the shape of a processing mark left on the slanted surface by the tip end of the cutting blade that has moved across and over the slanted surface, from a side of the dressing board opposite the lower surface thereof, thereby determining the shape of the tip end of the dressing board.

4. The shape determining method according to claim 3, wherein the tip end of the cutting blade cuts into the dressing board and moves across and over the slanted surface without moving across an end of the slanted surface at the lower surface of the dressing board.

5. The shape determining method according to claim 3, comprising:

determining the shape of the tip end of the cutting blade as curved if an end of the processing mark confirmed from the side of the dressing board opposite the lower surface thereof is of a curved shape.

6. The shape determining method according to claim 4, comprising:

determining the shape of the tip end of the cutting blade as curved if an end of the processing mark confirmed from the side of the dressing board opposite the lower surface thereof is of a curved shape.

* * * * *